Dec. 5, 1944.   G. MUFFLY   2,364,159
APPARATUS FOR ELECTRICAL BORE LOGGING
Filed Oct. 11, 1940   3 Sheets-Sheet 1
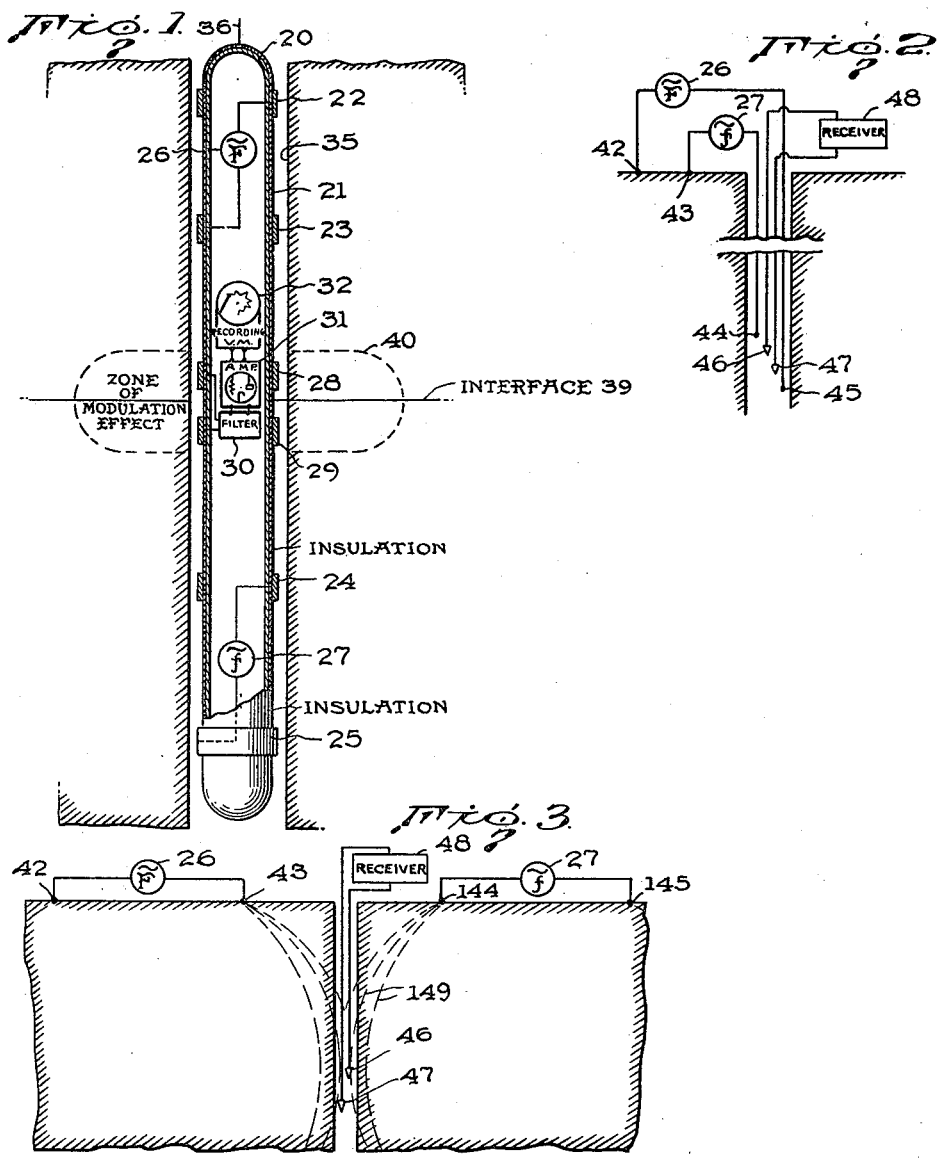
Inventor
G. Muffly,
By G. M. Houghton
Attorney Dec. 5, 1944.    G. MUFFLY    2,364,159
APPARATUS FOR ELECTRICAL BORE LOGGING
Filed Oct. 11, 1940    3 Sheets-Sheet 2
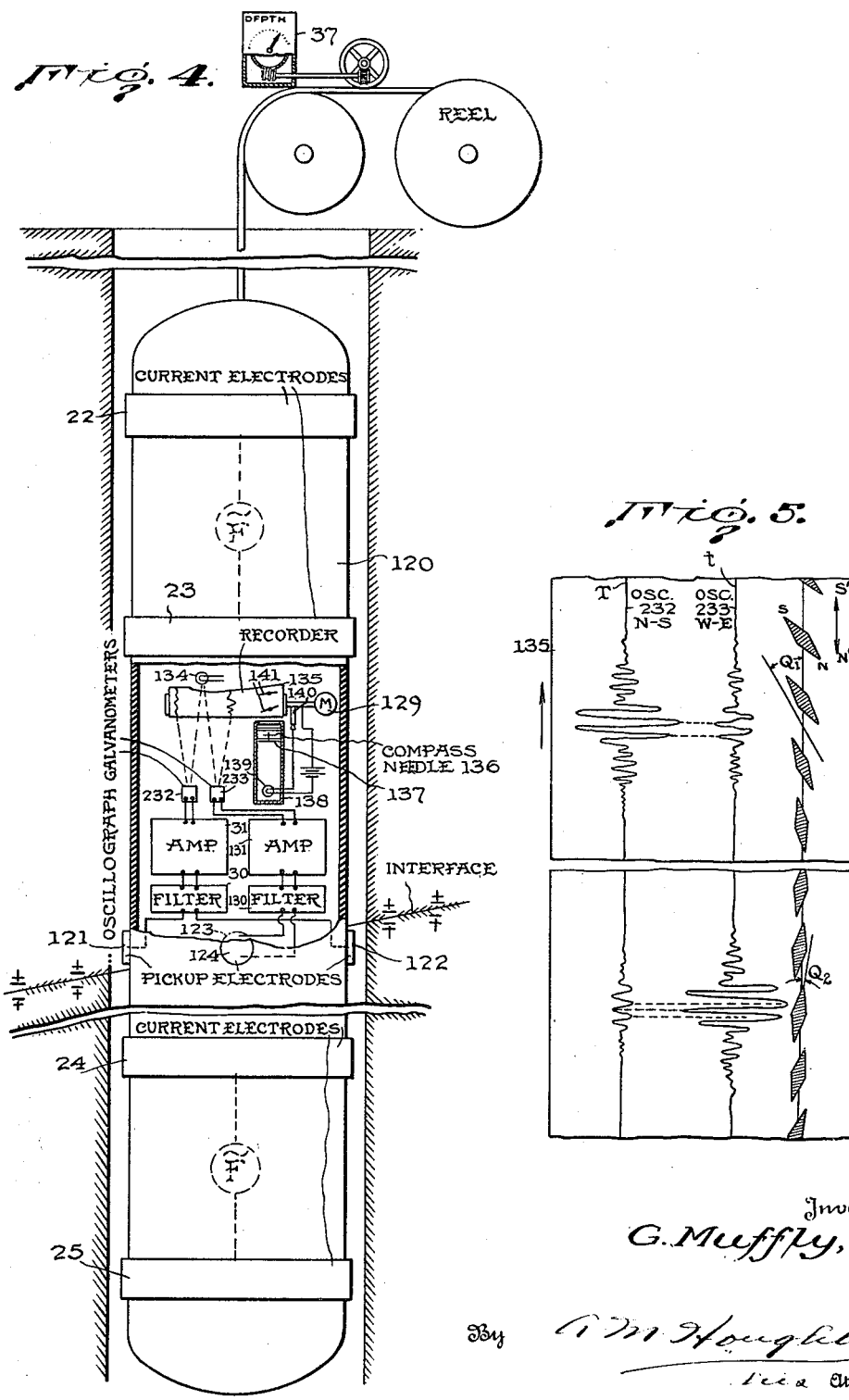

Dec. 5, 1944.  G. MUFFLY  2,364,159
APPARATUS FOR ELECTRICAL BORE LOGGING
Filed Oct. 11, 1940   3 Sheets-Sheet 3
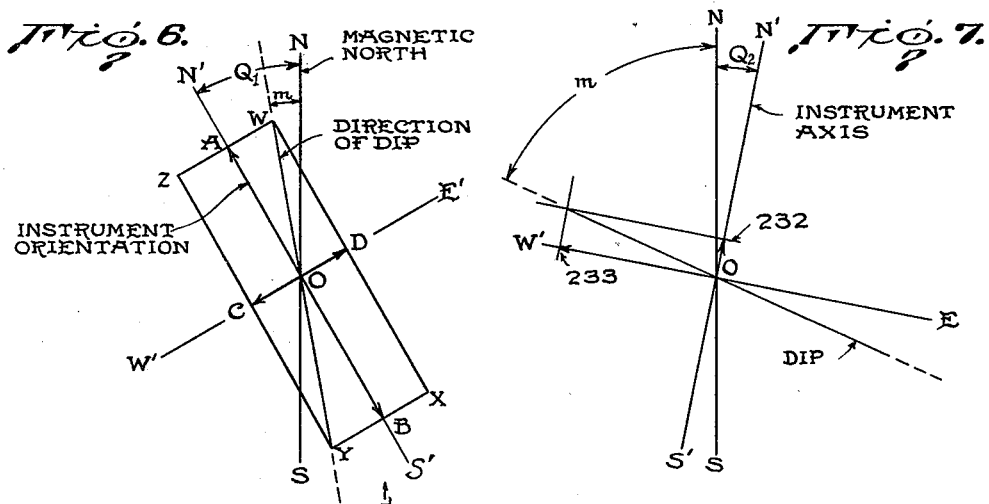
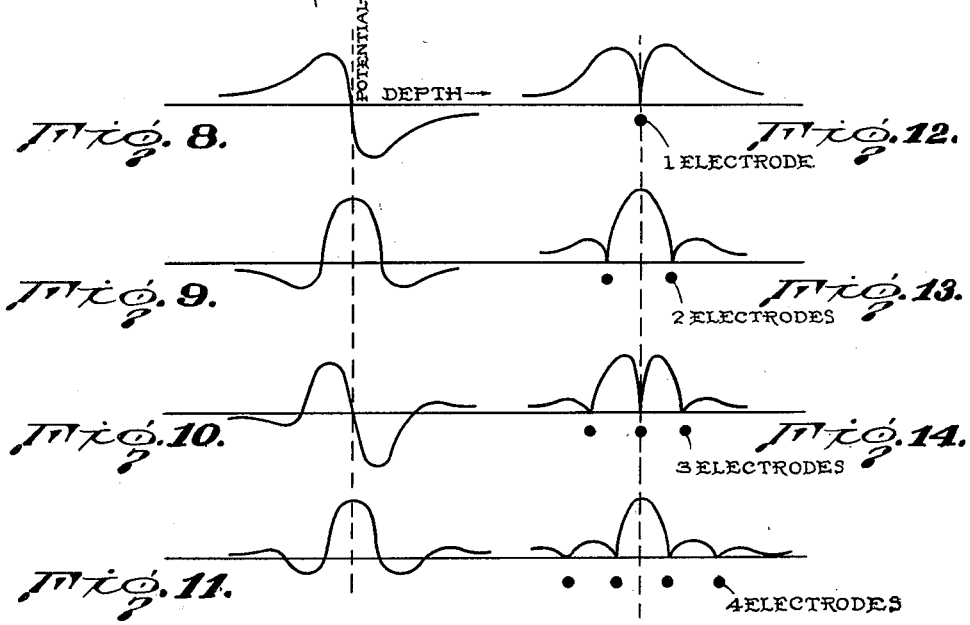
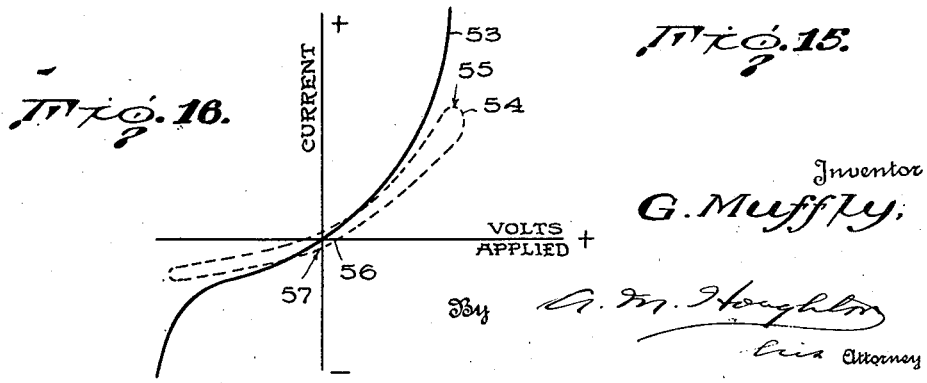
Inventor
G. Muffly,
By ⟨signature⟩
Attorney Patented Dec. 5, 1944

2,364,159

UNITED STATES PATENT OFFICE 2,364,159

APPARATUS FOR ELECTRICAL BORE LOGGING

Gary Muffly, Penn Township, Allegheny County, Pa., assignor to Gulf Research & Development Company, Pittsburgh, Pa., a corporation of Delaware Application October 11, 1940, Serial No. 360,852

1 Claim. (Cl. 175—182)

This invention or discovery relates to apparatus for electrical bore logging; and it comprises an apparatus for electrically exploring rock formations adjacent a well bore to detect electrically nonlinear stratum interfaces traversed by the bore, including at least one alternating current source adapted to create a current of definite frequency, and in current-transmitting relation to the earth so as to pass current of that frequency through the earth adjacent the bore, electrical pickup means located in the bore and adapted to detect alternating current components, filter means in current-receiving relation to the pickup means and adapted to discriminate against current of the source frequency, voltage exhibiting means in current-receiving relation to the filter, means for raising and lowering the pickup means in the bore and a depth indicator for exhibiting the depth of the pickup means; all as more fully hereinafter set forth and as claimed.

Electrical bore logging apparatus has found use in investigating the stratigraphy of rocks penetrated by a bore. In the best known forms of apparatus a pair of current electrodes is provided, mounted on a housing which can be moved through a bore, and supplied with direct or low frequency alternating current. Potentials are measured and recorded between another pair of electrodes near the current electrodes. Rock strata vary in resistivity or conductivity (the reciprocal of resistivity), and the record shows the resistivity at all depths in the bore. The apparatus is used to measure and record resistivities in various spaced bores in the region under investigation. In general the several records show characteristic fluctuations which can be correlated from one bore record to another, whereby the strata giving rise to the fluctuations can be traced from one bore to another. It is thus possible to measure the dip of such strata, by comparing their depths in the various bores. Thinning out of strata, faults, etc. can be detected and measured.

These resistivity surveys, properly conducted, give valuable results, but in many cases there is a serious source of error and confusion due to natural earth currents. These currents, which are direct or slowly fluctuating in character, sometimes give rise to potentials of the same order of magnitude as the artificial potentials being measured. They are rather erratic and unpredictable.

Among the objects of the present invention are the provision of an apparatus for bore logging based on the principle of detecting and measuring modulation effects occurring at strata interfaces; the provision of such an apparatus in which means are provided for applying alternating current to the earth and receiving and recording only alternating currents of frequency other than the applied frequency or frequencies; and the provision of such an apparatus in which the disturbing effect of natural ground currents is avoided.

The invention is based on the fact that strata interfaces and other surfaces of discontinuity in the earth behave like nonlinear impedance. Impedance is defined by the expression $$Z = \sqrt{\left(WL - \frac{1}{WC}\right)^2 + R^2}$$

wherein L is inductance, W is angular velocity ($2\pi$ times the frequency), C is capacitance and R is resistance. Impedance is the counterpart of resistance in non-alternating current systems. An impedance is termed nonlinear if equal increments of voltage or current applied to it, do not correspond to equal increments of current or voltage respectively passed by it. That is, if the voltage-current function of the impedance is a straight line, it is a linear impedance, but if this function is any sort of curve, the impedance is termed nonlinear. A nonlinear impedance gives rise to rectification and modulation.

According to the present invention means are provided for applying alternating currents, usually of two different frequencies, at spaced points in the earth, adjacent the bore, usually at a separate pair of spaced points for each current, such that the current fields overlap each other at least in part. If subterranean interfaces exist in the region traversed by the bore, modulation takes place thereat, with production of alternating current components of frequencies different from the applied frequencies; notably a component having a frequency equal to the sum of the applied frequencies, and a component having a frequency equal to the difference of the applied frequencies. These components are quite weak with respect to the applied frequencies but by suitable means they can be and are detected and measured at various points over the terrain under investigation.

In other words the invention makes use of the fact that alternating currents are modulated at stratum interfaces, with production of sidebands. The useful products of the modulation include a lower sideband and an upper sideband, respectively equal to the difference and the sum of the applied frequencies. Sidebands such as produced in the present invention, by modulation of two single frequencies by each other, consist of single frequencies and may be termed side frequencies.

The apparatus of the invention is susceptible of embodiment in various forms. In one advantageous embodiment, an insulated housing is provided, adapted to be lowered into a bore, and carrying two pairs of spaced current electrodes and a pair of spaced pickup electrodes. A pair of oscillators are provided in the housing, connected to the current electrodes, and a filter, amplifier and recording voltmeter are contained in the housing, connected to the pickup electrodes. This construction has the advantage that no electrical connections need be made to the housing from the surface. Or, if desired the oscillators and receiver can be kept at the surface and connected by a cable to the well electrodes. In other embodiments current is applied not within the bore itself but at points on the surface in the general neighborhood of the bore. In some cases the functions of the current electrodes and the pickup electrodes are combined, to simplify the cable connections. The apparatus is readily modified to enable direct measurement of strata dip direction.

In the method aspect of the invention the earth adjacent a bore is energized by passing at least one alternating current of definite frequency through the earth, the bore is explored for at least one alternating current component of a different frequency, characteristic of energization of an interface, and this component is selectively detected. Ordinarily the exploring is performed by pickup means moved through the bore, the current being applied at points on the surface of the earth or at points moving in fixed relation to the pickup means. In some cases the pickup means remain fixed at the surface of the earth and exploration is done by moving the points of current application up or down the bore.

In the accompanying drawings there are shown diagrammatically several examples of specific embodiments of apparatus within the purview of the invention, and diagrams illustrative of the principles underlying operation of the apparatus. In the drawings, Fig. 1 is a view in central vertical section of a well logging apparatus according to the invention, of self-contained type, Fig. 2 is a schematic view of a modification of the apparatus of Fig. 1, in which currents are applied between two points in a bore and two points at the surface of the earth, Fig. 3 is a schematic view of a modified apparatus organization in which currents are applied between two pairs of points at the surface, Fig. 4 is a view in central vertical section with some parts in elevation of a modification of Fig. 1 adapted for dip measurements, Fig. 5 is a reproduction of a portion of a record obtained with the apparatus of Fig. 4.

Figs. 6 and 7 are diagrams illustrative of the mode of interpretation of the record of Fig. 5, Figs. 8 to 15 are reproductions of portions of records showing the appearance of the record as obtained with various electrode systems, and Fig. 16 is a diagram illustrative of certain principles upon which the invention is based.

Referring to the drawings and more especially to Fig. 1, a particularly advantageous form of apparatus is shown including a sealed housing 20 having an insulating sheath 21 and two pairs of annular current electrodes 22, 23, 24 and 25, located adjacent the ends of the sheathed housing. Alternating current of some suitable frequency F is applied between electrodes 22 and 23 by an oscillator 26 and alternating current of another frequency $f$ is applied between electrodes 24 and 25 by an oscillator 27. A pair of spaced pickup electrodes 28 and 29 is mounted on the sheath in the middle portion of the housing. These are connected, through a filter 30 and amplifier 31, with a recording voltmeter 32. The amplifier is or can be a conventional alternating current vacuum tube amplifier with an appropriate adjustable filter, and requires no detailed description. The recording voltmeter likewise is or can be of conventional design.

The filter is tuned to reject the applied frequencies and to receive other than the applied frequencies; especially to receive the sum frequency or difference frequency, as explained in detail below. For example if F is 100 cycles and $f$ is 80 cycles, the filter is tuned to reject these frequencies and to pass 180 cycle signals or 20 cycle signals. The filter can be a high-pass, low-pass, band pass or band absorption filter, depending on particular requirements.

The oscillators may be alternating-current generators, vacuum tube circuits, etc. and are of a type capable of accurate control of the emitted frequency. Advantageously they are of a type giving a fairly pure sinusoidal wave. The potential is as high as is practicable and often is ten volts.

The housing is adapted to be suspended in a bore 35, by a cable 36 extending to the surface. The depth of the apparatus is indicated by a conventional depth meter 37 (Fig. 4) operated by the cable. The bore is advantageously filled with drilling mud or other suitable conductive liquid, not shown.

In operation the oscillators and the recording mechanism are put into operation and the housing is moved through the bore continuously or intermittently. Current flows from the current electrodes through the region adjacent the bore. If the surrounding rock is perfectly homogeneous, the voltmeter reads zero, but on coming opposite an interface such as indicated at 39 modulation effects occur at the interface, with production of distortion components including sum and difference frequency signals (side frequencies), the potential of which is recorded by the voltmeter. The term distortion component refers to any current or voltage differing in frequency from the applied current or currents.

Advantageously the applied frequencies are not integral multiples of each other. If they are integral multiples the side frequencies are harmonics of the lower frequency. For example the side frequencies due to waves of 10 and 20 cycles would be 10 and 30 cycles which are respectively the first harmonics (or fundamental) and third harmonic of 10 cycles. It is deemed better to apply frequencies such as 15 and 20 cycles, 80 and 100 cycles, etc. where the two frequencies are not integral multiples.

The character of the record obtained with the apparatus of Fig. 1 is described below in connection with diagrams 8 to 15.

The zone in which modulation effects occur is not sharply defined but is of roughly toroidal shape, as indicated at 40, symmetrical about the housing axis.

The magnitude of the recorded potential depends on the degree of difference, in electrical characteristics, between the two strata on either side of the interface.

The resolving power of the apparatus, that is its ability to distinguish between closely adjacent strata, is a function of the electrode spacing. For coarse surveys the several electrodes can conveniently be spaced farther from each other (e. g. twenty-five feet) than for fine surveys, where the separations can be only a foot or so.

It is convenient to arrest the movement of the housing at intervals during the survey. This produces flat spots on the voltmeter record, from which can be determined the depth at which the adjacent parts of the record were made.

Fig. 16 is a diagram illustrative of the current-voltage relations in a nonlinear impedance, such as a strata interface. The curve 53 shows how current changes with applied voltage, positive and negative. If the nonlinear impedance is non-inductive, and a given voltage or current is applied to it, the locus of all simultaneous values of voltage and current will merely be a segment of the curve. If however there are inductive effects or polarization effects the locus departs from the curve and becomes a closed curve as indicated in dashed lines at 54, which curve is traversed once for each cycle of electrical energy applied; for example it is traversed 80 times a second with an applied frequency of 80 cycles. If the applied voltage is sinusoidal and the closed-curve locus is any shape other than a straight line segment or an ellipse centered on the origin, then the impedance is nonlinear, because the applied sinusoidal voltage or current gives rise to a distorted wave shape containing components of other than the original frequency. The size of the current-voltage locus loop 54 depends on the applied amplitude. The shape depends on the frequency if the impedance is reactive and depends on the amplitude if the impedance is nonlinear. If polarization effects are present as in the earth, the impedance will generally be both reactive and nonlinear so that the exact shape of the loop varies in a complicated way with frequency and amplitude. The curve 54 represents the locus for a stratum interface to which a sinusoidal wave of definite amplitude and frequency is applied. The true characteristic of the interface, disregarding polarization and reactive effects might be shown at 53. However polarization effects cause a loop-shaped locus similar to the dotted curve shown. As the voltage increases from the origin toward maximum point 55 the current sags somewhat below the expected value due to polarization effect. At point 56 the current has ceased entirely but some residual polarization potential remains. When the applied voltage reaches zero at point 57 some reverse current is already flowing due to the polarization charge. The same sort of curve occurs in the opposite quadrant.

While the apparatus of Fig. 1 is compact, self-contained and convenient, if desired the current can be applied by oscillators between points near the well at the surface, and potential measurements can be exhibited at the surface. Fig. 2 shows such an arrangement, similar to Fig. 1 but utilizing fixed current electrodes 42 and 43, movable current electrodes 44 and 45, and movable receiving electrodes 46 and 47, connections to the electrodes being made through insulated cables in a way known per se in bore logging apparatus. The pickup electrodes are connected to a receiver 48 which is made up of the filter, amplifier and recording voltmeter as in Fig. 1.

In Fig. 3 the current electrodes 42, 43, 144 and 145 are all arranged at or near the surface of the earth so that the applied currents will follow paths approximately parallel to the well over a considerable vertical range as indicated at 149. The receiving electrodes are disposed as in Fig. 2. The current electrodes are best disposed at equal distances from each other and symmetrically with respect to the bore. The current electrode spacing is usually of the order of a few hundred feet, or greater when investigating very deep wells. In this embodiment high power oscillators are desirable.

The record produced in the practive of the invention exhibits in correspondence to each interface a series of characteristic fluctuations, with zero deflection occurring when the exploring electrode system is fairly within the bounds of a thick stratum. The fluctuations depend on the number and arrangement of the electrodes. In the setups of Figs. 2 and 3 the curves have several peaks in each case. The number of peaks in general is one more than the number of electrodes. This is because of the fact that as each current electrode passes through the interface the current through the interface drops to zero and then reverses direction. Since the exhibited effect depends on the amount of each current through the interface, the indicator also drops sharply to zero at this point. Similarly whenever a potential electrode passes an interface the polarity of the potential it receives reverses and also passes through zero. Since the electrode in question is the one nearest the interface it is the principal contributor to the total potential received so that when its potential is reversed there is bound to be a reversal of the total potential received. Since there is a dip as each electrode passes through the interface the total number of dips is equal to the number of electrodes, and the number of peaks must be one greater than the number of dips or electrodes. Ordinarily there are only one or two of these peaks of considerable amplitude in the center of the curve. The end peaks are insignificant because the system is less sensitive when several of the electrodes are not close to the interface.

Figs. 8 to 15 show the general character of the fluctuations. The number of electrodes increases from one, for the top pair of figures, to four for the bottom pair. Curves revealing polarity are on the left (Figs. 8 to 11). On the right (Figs. 12 to 15) are curves in which all deflections are upward but of the same amplitude as shown at the left. These curves are what are recorded by a simple A. C. voltmeter, as ordinarily employed in the invention, which indicates amplitude only and not polarity. The interface can be accurately located by the highest peak if an even number of electrodes is used, or by the sharp dip between the two major peaks if an odd number of electrodes is used.

In practicing the invention illustrated in Fig. 1 the rule given above for determining the number of peaks in the curve is modified. There are two current electrodes for each applied frequency and the distribution of current is not so simple as in the other setups. Due to the remoteness of the current electrodes the characteristic curve resembles that of a two electrode system although there are some insignificant wiggles at each end.

Fig. 4 shows a modification of Fig. 1 adapted for direct dip measurements. A shell 120 of insulating material (which can be an insulated metal shell as in Fig. 1 if desired) carries current electrodes and oscillators as in Fig. 1, but the annular pickup electrodes of Fig. 1 are replaced with four pickup electrodes, 121, 122, 123 and 124 at ninety degree angles about the periphery of the housing, half-way between the current electrodes. Two filters and amplifiers, 30 and 31, 130 and 131 are provided as shown, connected to opposite pairs of pickup electrodes. The amplifier outputs go to a pair of conventional oscillograph elements 232 and 233; these are galvanometric devices adapted to deviate beams of light from a lamp 134 proportionally to applied potential and to reflect the same upon a sheet of sensitized film or paper 135 upon which potentials are recorded by the oscillograph elements. The film is driven by a motor 129 at uniform slow speed. A compass needle 136 in a transparent housing 137 is mounted adjacent the film, in a light-tight chamber 138 containing a small-filament lamp 139 flashed on at intervals by a switch 140 driven by the motor, to cast shadow images 141 of the needle on the record from which the orientation of the housing at any depth can be determined.

In operation the apparatus is moved through the well as described in connection with Fig. 1. Fig. 5 is illustrative of records obtained with the aid of the apparatus of Fig. 4, the record corresponding to a short vertical travel in the well in which two interfaces are passed. A pair of traces T and t is obtained from oscillograph elements 232 and 233 as shown. The traces shown reveal two interfaces. Each trace exhibits a series of undulations corresponding to the interface, rather than a single deflection, for reasons described in connection with Figs. 8 to 15. The envelopes of the traces follow the fluctuations described in connection with Fig. 11. Compass needle deflections are recorded at frequent intervals as described so that the interpreter of the record can determine the angle Q between the magnetic meridian and some arbitrary horizontal axis of the instrument such as that passing centrally through pickup electrodes 123 and 124. The amplitude of the response varies with the amount of dip and azimuth of the electrodes. The response increases with increasing dip. It will be a maximum when the electrodes are in the plane of maximum dip and will drop to zero when the electrodes are oriented in direction of strike.

It is important to know the relative polarities of the voltages picked up. Use of the oscillograph as described provides this information. Each cycle of the A. C. wave picked up is recorded by the oscillograph so that phase reversals can be detected. A meter recording simply the effective A. C. values, would be insufficient since polarity is not indicated.

In interpreting the record, a vector diagram such as Fig. 6 or Fig. 7 is drawn for each interface of interest. The interpreter knows the positions of the electrodes and the polarity of the recorder circuits. For example, electrode 123 can be nominally called the north electrode and 121 will then be the west electrode, etc. If the dip is in a direction between the north and west electrodes it is known that the two oscillographs will deflect in phase, but if it is between the north and east electrodes, the oscillographs will deflect in opposite phases. Thus the relative polarity is used to determine the quadrants in which the dip lies. The relative amplitudes of the deflections and the compass directions give the necessary angles, as will be shown.

Fig. 6 shows the interpreter's diagram for the interface revealed by fluctuations at the top of Fig. 5. Line N—S is drawn to represent the magnetic meridian. Line N' S' is drawn to represent the actual position of the instrument with respect to line N—S as determined by measurement and interpolation of the nearest compass records beside the indicated maxima on the record. The angle $Q_1$ so measured on the record is laid off in the proper sense in Fig. 15. The deflection of north-south oscillograph 232 is laid off along line N' S' and the deflection of east-west oscillograph 233 is laid out along the line W' E'. These components can be laid out in all four directions as vectors AO, BO, CO, and DO. It will be seen that these four possible dip components can be combined to get four different vectors indicating dip, namely WO, XO, YO, or ZO. However, it is known from Fig. 5 that the two component voltages are out of phase. Hence the vector cannot lie in the northwest or southeast quadrants, and therefore the dip must be in the direction WY.

The angle m (Fig. 6) gives the direction of dip with respect to magnetic north. The sense of the dip, that is whether up dip and down dip, can be determined with the help of other information such as surveys in adjacent wells or use of surface geology.

Fig. 7 is similar to Fig. 6 but corresponds to the deflections shown in the lower part of Fig. 5 in which the values have all changed. The electrode voltages are in the same phase in this case, so that the N' W'—S' E' quadrants are indicated.

What I claim is:

A bore logging apparatus comprising in combination two pairs of current electrodes adapted to be placed in current conductive relation to the earth adjoining a bore, two alternating current generating means one connected to each electrode pair and supplying thereto currents of different frequencies, a pair of pickup electrodes in current conductive relation to the earth adjoining the bore and at least one of which is adapted for positioning at various levels within the bore, filtering means connected to the pickup electrodes and tuned to exclude all applied frequencies, and alternating current potential exhibiting means connected to said filtering means, the potentials measured thereby being those created from applied potentials by modulation at the strata interfaces.

GARY MUFFLY.